April 20, 1965 S. O. NELSON 3,179,352
TILT WING AIRCRAFT
Filed Sept. 21, 1959 6 Sheets-Sheet 1
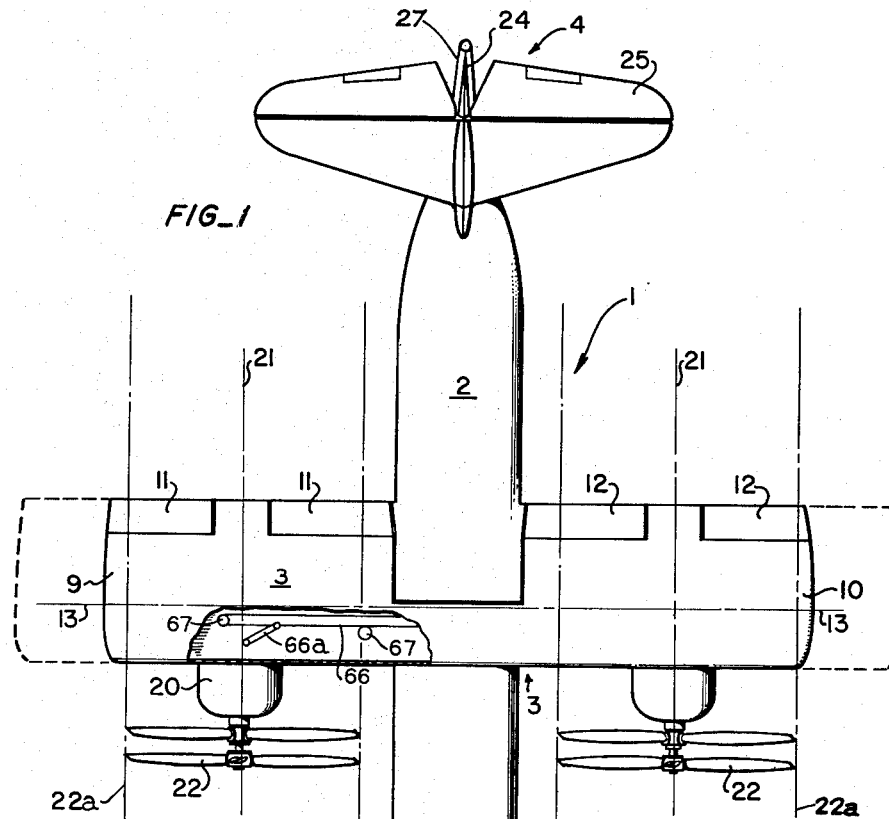
FIG_1
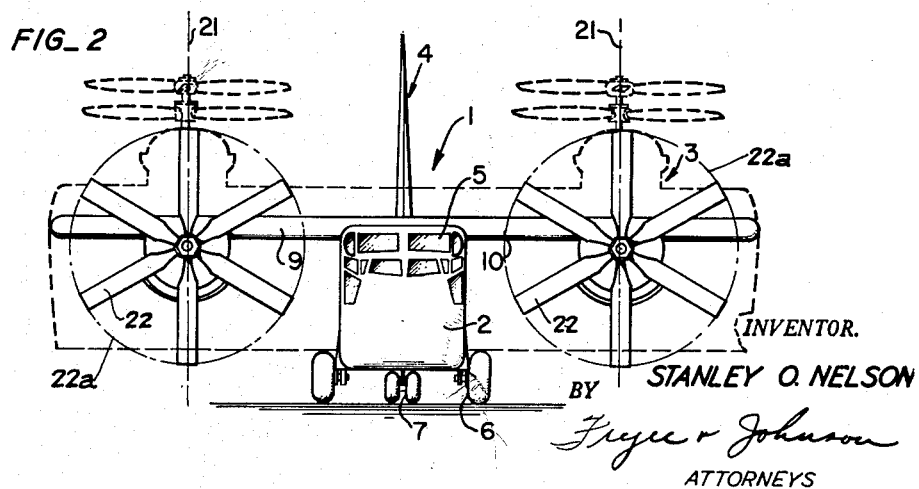
FIG_2
INVENTOR.
STANLEY O. NELSON
BY
ATTORNEYS April 20, 1965    S. O. NELSON    3,179,352
TILT WING AIRCRAFT
Filed Sept. 21, 1959    6 Sheets-Sheet 2
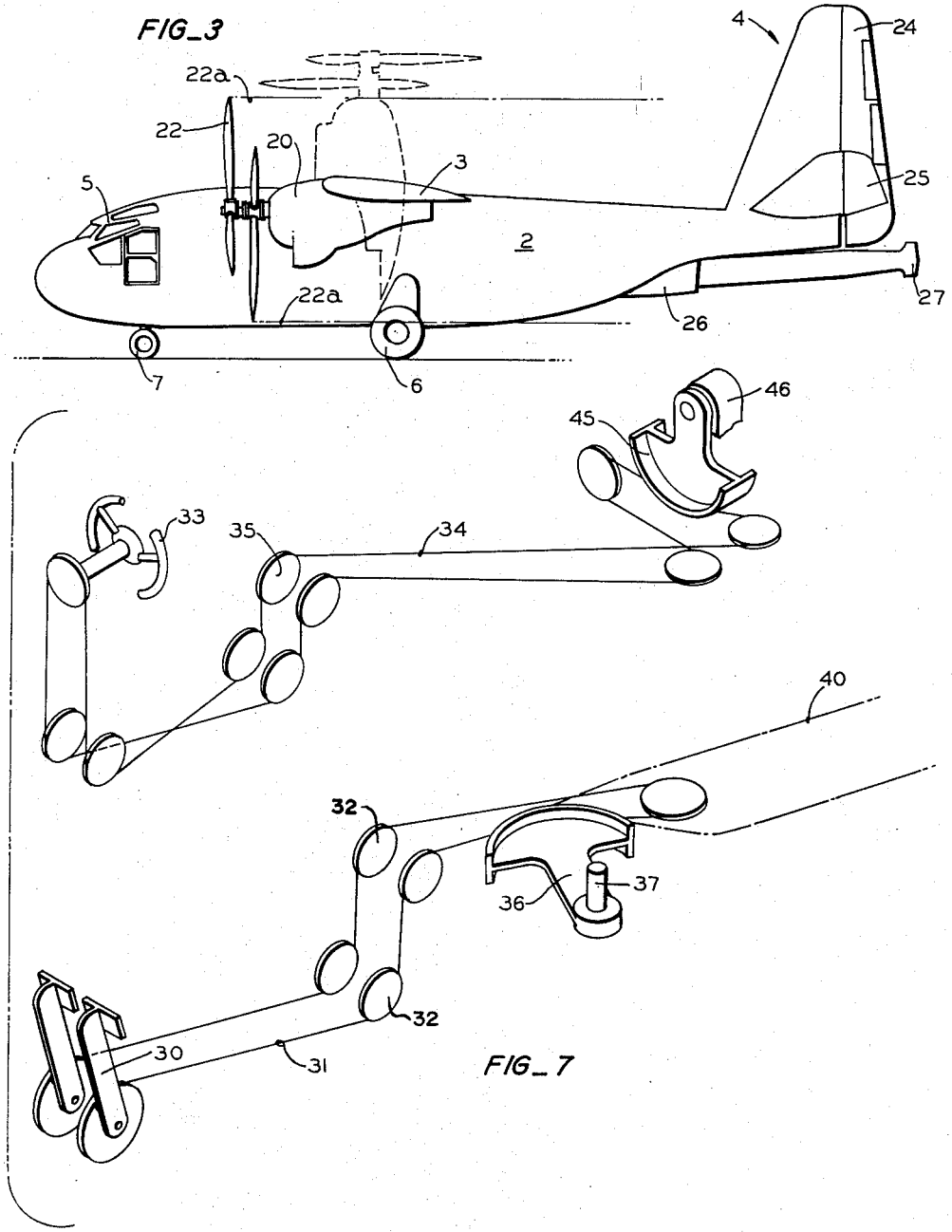
FIG_3
FIG_7
INVENTOR.
STANLEY O. NELSON
BY
*Fryer & Johnson*
ATTORNEYS

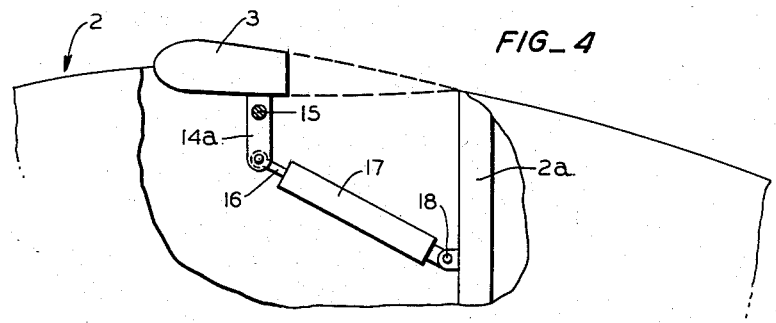
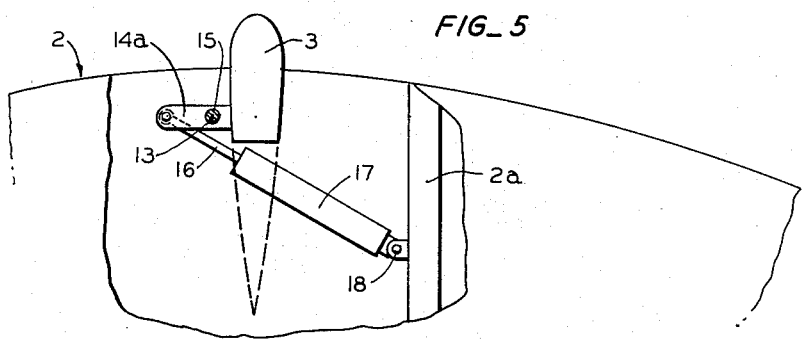
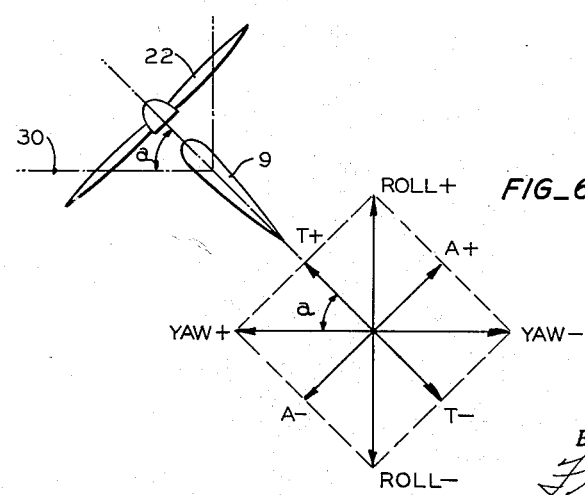

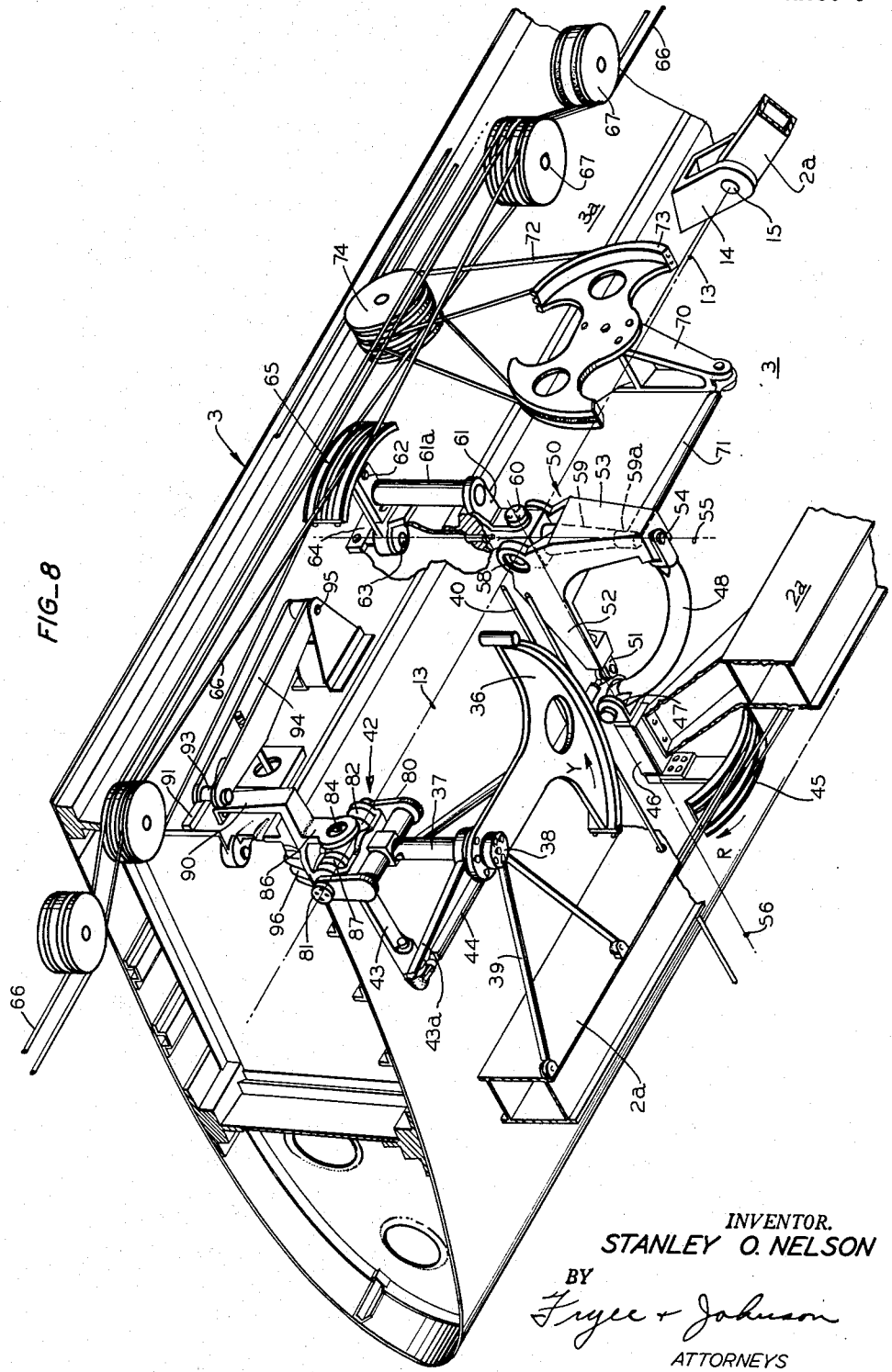

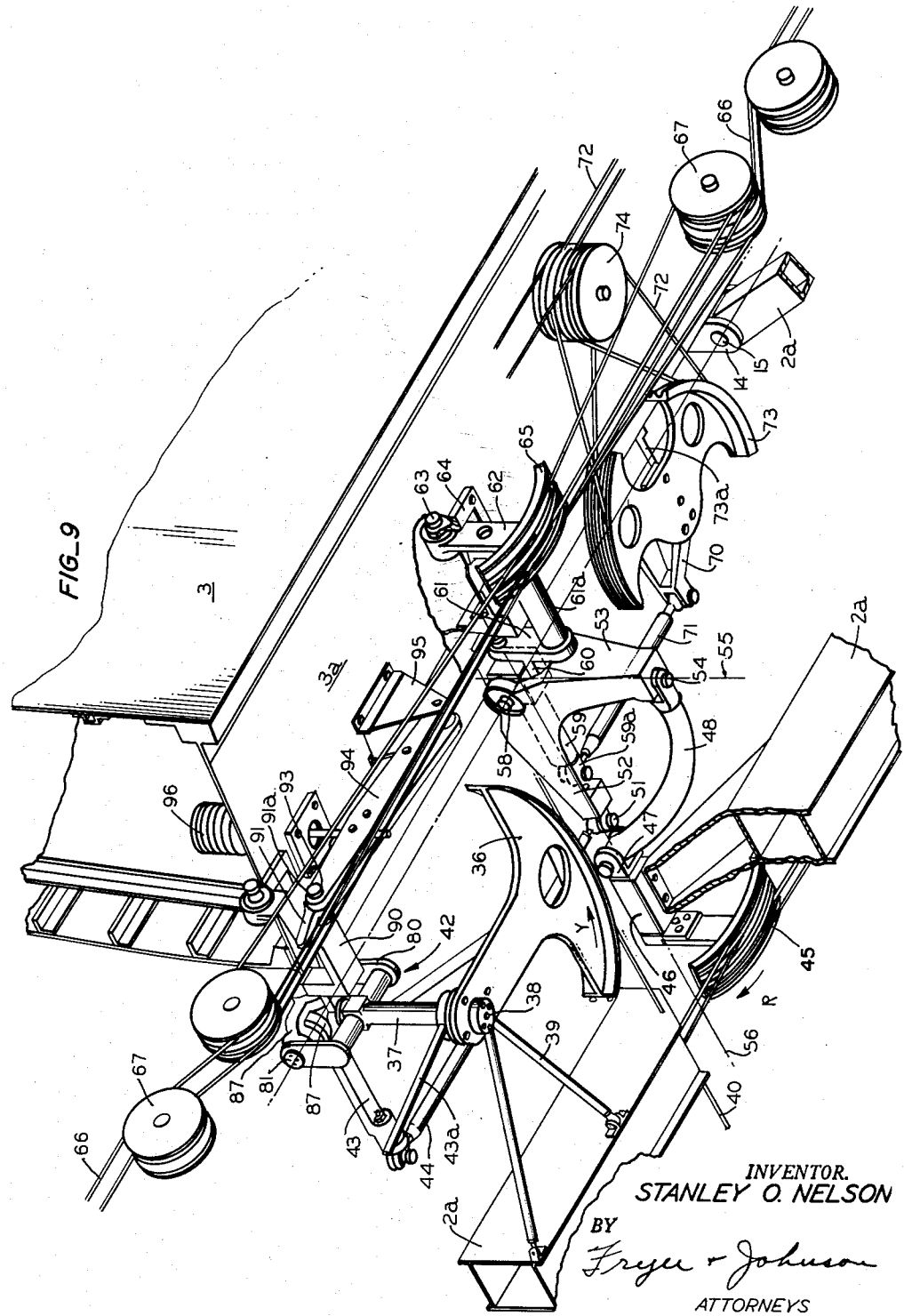

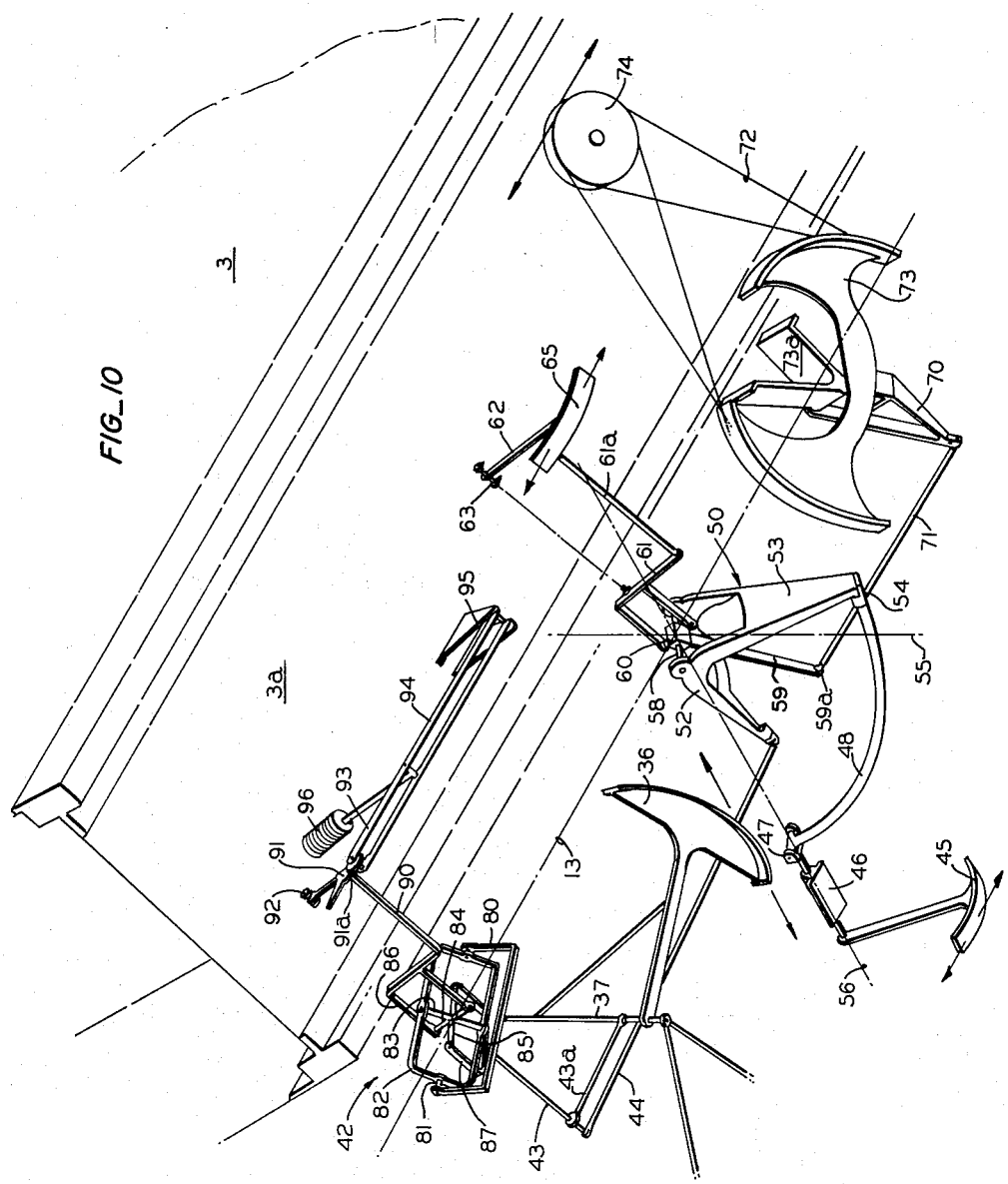

3,179,352
TILT WING AIRCRAFT
Stanley O. Nelson, Los Altos, Calif., assignor, by mesne assignments, to Hiller Aircraft Company, Inc., Menlo Park, Calif., a corporation of Delaware
Filed Sept. 21, 1959, Ser. No. 841,345
24 Claims. (Cl. 244—7)

This invention relates to tilt wing aircraft, and more particularly, to mechanisms and controls in such aircraft that facilitate the transition between horizontal and vertical flight.

Many efforts have been made to produce a mechanically practicable aircraft having the speed and range of a fixed wing airplane coupled with the capacity to hover and to take off and land in a vertical path. Toward this end, efforts have been made to provide pivotal mountings for the wings and propellers so that they may be tilted about an axis longitudinal of the wings in order to vary selectively the directions of lift and thrust. However, with the change in the directions in which these forces acted came a corresponding change in the flight characteristics produced as a result of a given manual input to the pilot controls. In the first place, the ailerons, rudders, elevators and other stationary airfoil assemblies would normally be rendered virtually inoperative in the extremely slow speeds of vertical flight and even if they were capable of operating, flight reactions produced by the vertical relative wind would obviously be in directions different from those produced during normal flight with the same control manipulations by the pilot.

Since virtually all of the conventional mechanisms for maintaining flight control produce a different flight reaction in vertical flight, their operation through all ranges was beyond the cability of the average pilot.

It is, therefore, an object of my invention to provide tilt wing aircraft having a single set of pilot controls operable for both horizontal and vertical flight.

It is a further object of my invention to provide a composite system of pilot operated controls which produces the same predictable flight reaction in response to manipulation in all dispositions of the flight control elements between horizontal and vertical.

It is a further object of my invention to provide a tilt wing aircraft having pilot controls, which in all conditions of flight are operated in the same manner as are controls for conventional fixed wing aircraft.

It is a further object of my invention to provide a tilt wing aircraft wherein certain conventional flight controls are adapted for operation for vertical as well as horizontal flight.

It is a further object of my invention to adapt ailerons for operation in all dispositions of a tiltable wing for a vertical take-off and landing aircraft.

An aircraft embodying the features of this invention would include pivotal mountings about which the wings and engines may be tilted to vary the direction of lift and thrust. The propellers are so disposed with relation to the wing that the ailerons are continuously in their slip-stream and, hence, continue to function as airfoil control members responsive to pilot control in all positions of the wing. Since the "lift" produced by the ailerons is directed progressively more and more toward the rear as the wings move from horizontal to vertical, it includes a gradually increasing component of negative thrust and, therefore, becomes an instrumentality for controlling yaw. Also, during the transition from horizontal to vertical the action produced by a thrust differential between the engines changes gradually from pure yaw to roll. There is provided, therefore, an integrating mechanism designed to distribute the control manipulations of the pilot between the thrust differential mechanism and the aileron in varying ratios dependent upon the wing angle and, hence, the degree to which either will contribute to the control of the desired flight action, roll or yaw. In this way, a given action of the pilot will produce a reasonably consistent flight characteristic without regard to the particular element producing the characteristic in any given disposition of the wing. Thus, as the wing tilts toward the vertical, a gradiently increasing portion of the wheel movement will be shifted from the ailerons to the thrust control mechanism in order to maintain continuous control of roll. Similarly, pedal movement will be translated in increasing amounts to aileron movement, always to produce yaw.

Since it is desirable to use the rudder instead of the engine for producing yaw in horizontal flight, the aircraft also includes mechanism for accomplishing gradual elimination of pedal input to the thrust differential producing means as the wing returns to its horizontal position. There is also provided a separate thrust delivering mechanism to move the tail portion of the plane selectively upwardly or downwardly during vertical movement of the aircraft and thereby to perform the function of the then inoperative elevators, i.e. to control pitch of the aircraft.

Other objects and advantages of the invention will be apparent from the description following when read in connection with the drawing attached wherein:

FIG. 1 is a top outline view of an aircraft embodying features of this invention;

FIG. 2 is a front outline of the aircraft;

FIG. 3 is a side outline of the aircraft;

FIGS. 4 and 5 are partial section views schematically showing a wing tilting mechanism;

FIG. 6 is a graphical illustration of wing forces;

FIG. 7 is a schematic illustration of flight control mechanism;

FIG. 8 is a partial section view of wing disposed horizontally showing control mechanism constituting a part of this invention;

FIG. 9 is a partial section view of the aircraft wing disposed vertically with the control mechanism; and FIG. 10 is a schematic illustration of the control mechanism.

Referring now to the drawings, there is shown, merely for purposes of illustration a possible design for a tilt wing plane 1 including a fuselage 2, wing assembly 3 and tail assembly 4. The fuselage 2, as usual, includes suitable pilot's cabin 5 and wheels 6 and 7 for landing and ground movement. The wing assemby 3 includes right and left wing portions 9 and 10 and wing lift member or ailerons 11 and 12. The wings 9 and 10 are actually part of a single structure 3 which may be tilted as a unit about an axis 13 extending spanwise of the wings. The tilting of the wings may be accomplished by a number of structural assemblies. For purposes of illustration, there is shown (FIGS. 4, 5, 8 and 9) a plurality of brackets 14 rigidly secured to the wings 3. The brackets 14 are rotatably carried on journal members 15 or pins rigidly secured to the fuselage frame 2a along axis 13. Pivotally connected to at least one bracket arm 14a (FIGS. 4 and 5) is the ram 16 of a hydraulic cylinder 17 pivotally connected to the fuselage frame 2a at 18. The mechanical arrangement is such that a stroke of the ram 16 will carry the wing between the horizontal position shown in solid lines in FIG. 3 and the vertical position there shown in phantom.

The engine nacelles 20 are mounted directly on the wing and the axis 21 of each is substantially centered laterally along the length of the associated wing 9 or 10. As seen in FIGS. 1–3, each engine is provided with a pair of co-axial propellers, each pair of which preferably is mounted for counter-rotation in any well known manner. The propellers 22 are sufficiently large in diameter and close to the leading edge of the wing 3 that virtually the entire wing 9 and 10 is carried in the slipstream of the propeller indicated by the lines 22a. Since the wings and propellers tilt together, ailerons 11 and 12 are continuously submerged in the slipstreams regardless of the wing angle. Consequently, the ailerons are continuously responsive to pilot control. In this connection, the propeller diameter should be considered in determining wing span to prevent the occurrence of excessive wing area beyond the slipstream that could cause wing tip stall in transitional flight. Because of the increased lift with directive thrust, the wing tips can be shortened, as indicated in phantom in FIG. 1.

For use in normal flight, the tail assembly 4 includes a rudder 24 and elevators 25 (FIG. 3) to control yaw and pitch respectively. During vertical and transitional flight, other primary flight elements control yaw, as will hereinafter be explained, but there is also provided auxiliary means specifically for controlling pitch during the conditions of flight when low forward speed renders the elevators 25 virtually inoperative. Such means may include a small jet engine 26 having a tail pipe or discharge outlet 27 which is divided to produce selectively either an upward or a downward thrust at the tail. This may be accomplished by suitable valve means (not shown) operated in response to usual movement of the elevator controls. Of course, this auxiliary jet pitch control engine 26 need be used only during vertical flight when the elevators are ineffective.

Referring now to FIG. 6, there is shown schematically and graphically the forces about a tilted wing and propeller. It can be seen from an examination of the vector analysis that a positive roll, i.e. upward movement of the wing section 9 about the longitudinal axis of the fuselage, is a composite force produced by a positive (lift) aileron A+ and a positive (forward) thrust T+. Similarly, a positive yaw force tending to pivot the wing forward about a vertical axis of the fuselage, is a composite of a positive thrust T+ and a negative (down) aileron force A− (lift at the opposite wing). With the wing horizontal, the angle of thrust $a$ coincides with the yaw vector and in that condition, thrust effects only yaw. With the wing disposed vertically, the direction of thrust coincides with the roll vector and, therefore, input to a thrust differential mechanism will control only roll. It can also be seen that the yawing force attributable to thrust is, at any angle, related to the cosine of the tilt angle $a$ measured from the horizontal and that the roll attributable to thrust is related to the sine of the tilt angle. Additionally, movement of an aileron will produce only roll when the wing is horizontal and will produce only yaw when the wing is vertical. Under aileron control, yaw varies with the sine of the wing tilt angle and roll varies with the cosine of the tilt angle. Therefore, in all transitional stages between horizontal and vertical, yaw is produced by the horizontal component of forward thrust reduced by the horizontal component of aileron lift acting toward the rear of the plane, and roll is the summation of the vertical components of thrust and aileron forces. Stated algebraically:

$$Yaw = T \cos a - A \sin a$$
$$Roll = T \sin a + A \cos a$$

Since these flight characteristics result from a combination of thrust and lift in changing ratios, it is virtually impossible without special controls, for a pilot to know, at any stage of wing angle, how much input to deliver at the controls to vary the differential thrust and/or lift in order to achieve the desired flight characteristics.

A significant feature of this invention is a pilot control integrating device which distributes the pilot's input to the controls in an appropriate ratio to the aileron and thrust differential operating mechanisms so that the desired amount of roll or yaw is produced. Referring to FIGS. 7 to 10 the pilot control system includes conventional foot pedals 30 which may be depressed selectively to pull the pedal input cable 31 in the appropriate direction guided over pulleys 32. Similarly the conventional wheel 33 may be turned to direct a force along a wheel input cable 34 guided on pulleys 35. The motion transmitted by the input cables 31 and 34 is distributed to appropriate controls by an integrator mechanism. For example, the pedal input cable 31 is connected at opposite ends to the reel surface of a pedal input sector 36 keyed to a shaft 37 rotatably mounted in bearings 38 rigidly secured to the fuselage frame 2a by suitable brackets or supports 39. The shaft is turned through an arc determined by the longitudinal movement of the pedal input cables 31. When the shaft 37 is turned, it acts through a yaw integrator 42 (hereinafter described) to pivot a yaw integrator output arm 43 through an arc, and thus transmits longitudinal movement to a yaw input link 44 pivotally connected to the output arm. A link 43a connects the shaft 37 and the output arm 43 to limit the movement of the arm 43 to a single plane. Besides delivering a motion input to the yaw integrator, the sector 36 also winds cables 40 shown schematically to operate the conventional tail rudder for yaw control in normal flight.

The integrator mechanism also includes a wheel input sector 45 secured onto a shaft rotatably mounted in a bearing 46 fixed to the fuselage frame 2a to rotate a bifurcated extension 47 of the shaft in response to movement of the wheel input cable 34. The shaft extension 47 is pivoted to a curved roll input arm 48, the opposite end of which swings through an arc with corresponding movement of the wheel or roll input sector 45.

Yaw and roll input motion transmitted through the yaw input link 44 and the roll input arm 48 are mixed at the roll-yaw integrator lever 50. The yaw input link 44 is pivotally connected to a swivel 51 carried at the end of the normally horizontal arm 52 of the two-armed generally L-shaped integrator lever 50. The roll input arm 48 is pivotally connected at the end of the normally vertical arm 53, the pivotal connection 54 constituting another swivel joint. Thus, when either the yaw input link or the roll input arm is moved, it pivots the integrator lever arm 52 or 53 to which it is connected about the swivel joint in the other arm. Therefore, motion delivered by the pilot through the pedal is translated into pivotal movement of the horizontal arm 52 about the axis 55 of the other arm 53 which normally coincides with the vertical axis 55, and wheel input pivots the vertical arm 53 about the axis 56 of the other arm 52 which normally lies along horizontal axis 56. Of course, in the event that both controls are moved simultaneously, both arms, and hence both swivels are shifted at the same time. Thus, each arm is then pivoted about an axis which has itself shifted so that a composite action is delivered to the integrator, as illustrated schematically in FIG. 10. There it can be seen that the arms 52 and 53 constitute both pivotal levers and shiftable axes.

Pivotally carried on the integrator lever 50 about a trunnion 58 normally concentric with the wing pivot axis 13 is an aileron control arm 59, itself hingedly connected about a transverse pivot 60 to a thrust control arm 61. The hinged connections 58 and 60 constitute a universal joint connection with the integrator lever 50 that permits the aforedescribed composite motion. When the thrust control arm 61 is pivoted it swings thrust sector control arm 62 about a pivot 63. The pivot 63 is on a bracket 64 fixed to the reinforcement web 3a of the wing 3. When arm 61 pivots arm 62 through connector 61a an arcuate sector 65 is pivoted to wind cables 66 over appropriate pulleys 67 to operate a conventional device, shown generally at 66a in FIG. 1, for producing a selected thrust differential between the propellers 22 as by changing the pitch thereof.

When the aileron control arm 59 is pivoted, it pivots a sector arm 70 through link 71 to wind aileron control cables 72 over the reel sector 73. The cables are carried over pulleys 74 to impart a differential movement to the ailerons 11 and 12.

The bracket 64 on which the thrust differential sector 65 is pivoted is fixed to a longitudinal or spanwise strength web 3a of the wing and the aileron control bracket 73a is fixed to the wing surface so that both brackets pivot with the wing 3 about the wing shift axis 13 carrying the respective control arms 59 and 61 with them. Thus, with the wing horizontal, as shown in FIG. 8, the thrust differential sector pivots about the vertical axis 55 and the aileron control sector 73 pivots with pivotal movement of aileron control arm 59 about the horizontal axis 56 (FIG. 9). In this condition, pivotal movement of the normally horizontal integrator arm 52 produced by yaw input link 44, winds the cable 66 on the thrust differential sector 65, but the swivel joint 59a in the roll control arm 59 rotates idly to effect no movement of the aileron control sector 73. Thus, when the wing 3 is horizontal pedal control effects only thrust, i.e. only yaw. Similarly, pivotal movement of the vertical arm 53 as a result of roll input, carries the arm 59 with it to control the ailerons while the swivel joint at 60 leaves the thrust sector unaffected. Thus, wheel input when the wing 3 is horizontal effects only the ailerons, i.e. controls only roll.

When the wing is vertical, as shown in FIG. 9 the thrust differential control sector 65 is pivoted only by the roll input arm 48, and the aileron sector 73 is pivoted only by the yaw input link 44. Thus, in this condition, the pedals still control only yaw although yaw is now controlled by the ailerons acting transverse to the vertical wing. Similarly, the wheel controls only roll which is now produced by thrust differential in a vertical direction. Thus, in either the horizontal or vertical position of the wing, operation of a given control be it wheel or pedal, will produce the same action, roll or yaw, of the aircraft.

This integrator mechanism is designed to produce a given action of both the aileron sector 73 and the thrust differential sector 65 upon movement of either the pedals or the wheel at any transitional stage of the wings between their horizontal and vertical dispositions. The ratio in which the input motion to either control is divided is dependent upon the angle of wing tilt. The aileron control arm 59 pivots with the tilting of the wing 3 away from its position perpendicular to its axis of rotation which normally lies along roll axis 56. Thus, the effective radius of the arc of movement transmitted to the aileron sector arm 70 by the aileron control arm 59 as it pivots about the horizontal integrator axis 56 is gradually shortened as a function of the cosine of the wing tilt angle $a$ measured from the horizontal. At the same time, its effective length about the normal vertical axis 55 is gradually increased as a function of the sine of the wing tilt angle. Similarly, the effective radius of the thrust differential sector arm 62 about the vertical axis 55 decreases as a cosine function and its effective length about the horizontal axis 56 increases as a sine function as the wing tilts from the horizontal.

Thus, at any given tilt angle a rotation of the vertical integrator arm 53 under influence of the wheel input sector 45 will pivot the aileron control arm 59 about the horizontal axis 56. Since the effective radius of the arc struck thereby is related to the cosine of the wing tilt angle, maximum aileron action is not achieved. In the meantime, since the thrust control pivot axis 63 has shifted toward the horizontal, the thrust sector arm 62 has a vertical radius component related to the sine of the wing tilt angle. Consequently, wheel input is divided into two components, one, modified by the cosine of the wing tilt angle controls the ailerons and the other modified by the sine of the tilt angle, controls thrust differential. This conforms to the formula:

$$\text{Roll} = T \sin a + A \cos a$$

Therefore:

$$W \sim T' \sin a + A' \cos a$$

where

W = wheel input
A' = aileron control arm movement
T' = Thrust sector control arm movement Similarly, pedal operation, i.e. pivotal movement of the horizontal integrator arm 52, produces pivotal movement of a gradually increasing effective horizontal aileron control arm 59 and a gradually decreasing effective vertical thrust sector arm 62. Thus, according to the formula:

$$\text{Yaw} = T \cos a - A \sin a$$

pedal input (P) is distributed as follows:

$$P \sim T' \cos a - A' \sin a$$

It is to be noted that, with the wings 3 in a transitional stage, pedal input in the direction of the arrow Y to produce yaw, rocks the thrust differential sector 65 to the left, but it moves the roll integrator control arm 70 to the right; and the wheel input delivered in the direction of the arrow R rocks the thrust differential sector 65 to the left and pulls the aileron control sector arm 70 to the left also. Thus, the thrust control sector 65 and the aileron control sector 73 pivot in the same direction to control roll, but in opposite directions to control yaw. This is consistent with the formulae above derived showing that yaw is controlled by positive thrust and negative aileron force while roll is the composite of positive thrust and positive aileron.

For sake of simplicity pedal input has heretofore been described as if it were transferred fully and directly from the input sector 36 to the control integrator arm 52 to produce a component of yaw by thrust differential through all stages of wing inclination. However, as the wing tilts toward its horizontal position and the plane approaches level flight, the rudder 24 of the aircraft becomes more and more effective in control of yaw. Since the rudder is more efficient than the propellers for this purpose, and less demanding upon the engines, it is desirable to eliminate the engines as a means for producing yaw in horizontal flight. Towards this end, there is provided a yaw integrator 42 including a yaw input shaft yoke 80 (FIG. 10) carried on the pedal input shaft 37. Between the arms of the yoke 80 pivotally supported on trunnions 81 is a generally rectangular frame 82 rotatably carrying a trunnion 83 at its mid-point. Rigidly secured to the central trunnion are two other trunnions 84 and 85 disposed mutually perpendicular. The trunnion 84 is a control trunnion and is mounted between the arms of a control yoke 86 which, for the time being, may be regarded as fixed to the wing 3 so that the trunnion 84 lies parallel to the wing and shifts from the vertical to the horizontal therewith.

The trunnion 85 is rotatably carried between the arms of a pedal motion output yoke 87 carried on the yaw integrator output arm 43. It can be seen from an inspection of the drawings that, with the wing horizontal, the control trunnion 84 of the fixed yoke 86 is perpendicular to the pedal input shaft 37 and, since as a fixed member it will not pivot, it locks the arm 43 against rotation, allowing shaft 37 to rotate about trunnion 83. However, with the wing vertical, the fixed control trunnion 84 is concentric with the pedal input shaft 37 so that rotation of the input yoke 80 pivots the output trunnion 85 about the control trunnion 84 to swing the yoke 87 therewith to achieve full movement of the yaw integrator output arm 43. Thus, a compound yaw control is introduced. With the wing vertical, thrust has no effect upon yaw, but as the wing inclination is reduced toward the horizontal the yaw-roll control integrator 50 gradually introduces a component of thrust to combine with the ailerons for control of yaw. At the same time, this action is compensated for, to an extent by the yaw integrator mechanism 42 which, because of the action of the double universal joints 81, 84, 85 delivers less and less motion to the integrator mechanism in response to pedal input. Therefore, as thrust assumes the identity of the yaw-producing agent less and less input is delivered, until no pedal input is delivered to the integrator system in the horizontal disposition of the wings. Of course, it is understood that throughout this time the rudder operating cables 40 (FIG. 7) transmit the normal amount of pedal input so that when the aircraft is in horizontal flight rendering the rudder effective, elimination of power differential control is desirable. As a safety feature of my invention I provide an overload detent mechanism which releases the yaw integrator system and prevents rupturing of any of the elements in the event of excessive pedal input with the controls jammed. For that purpose, the fixed control yoke 86 is carried on an arm 90 extending from a composite cam member 91 pivotally mounted on a bracket 92 fixed to the wing reinforcing web 3a. The cam 91 is prevented from pivoting by engagement of a follower 93 in a depression 91a in the cam surface. The follower 93 is rotatably carried on an arm 94 pivotally mounted at 95 to the wing and urged against the cam depression 91a, under the force of a powerful spring 96. However, when the control system is jammed and excessive twisting force is asserted against the control yoke arm 90, the follower can be cammed out of the cam surface depression and the arm 90 released.

In operation, the aircraft is started with the wings 3 and propeller shafts 21 pointed vertically by operation of the hydraulic cylinder 17. Thrust is delivered by the propellers 22 to lift the aircraft off of the ground with the directional jet pitch control 27 being operated to keep the ship level. For yaw control the pilot operates the conventional pedals to rotate the pedal input shaft 37 (FIG. 9). With the control yoke 86 pivoted so that its trunnion 84 is coaxial with the input shaft, the shaft is freely rotatable and yaw output arm 43 pivots a full stroke to swing the horizontal arm 52 of the roll-yaw integrator about the normally vertical arm 53. With the wing vertical, the aileron control arm 59 moves with the horizontal integrator arm 52 and the ailerons produce yaw force. Use of the ailerons to control yaw is possible during vertical flight because the dimensions of the propeller and wings are such that virtually the entire aileron area is continuously within the propeller slipstream 22a. For roll, the wheel is operated to swing the curved roll input arm 48 and pivot the vertical integrator arm 53 and the thrust differential arm 62 therewith.

As the aircraft gains altitude, the transition to level flight is commenced by energization of the hydraulic cylinder 17 to bring the wings 3 back toward their horizontal disposition. In this condition, the aileron and thrust differential control arms 59 and 62 are disposed intermediate the axes of the horizontal and vertical integrator arms 52 and 53. Thus, the effective radius of movement delivered to each about a given axis is a function of the wing tilt angle. For example, the effective length of aileron control arm 59 about the vertical axis 55 decreases as the wing returns to the horizontal, thus the amount of aileron control produced in response to pedal input at 36 is modified by the sine of the wing angle from the horizontal. At the same time, pedal input delivers a component of thrust because of an increasing effective radius of the thrust control arm 62 about the vertical axis. This is a function of the cosine of the wing tilt angle. Thus, the roll-yaw integrator mechanism 50 mixes an increasing component of thrust and a decreasing component of aileron force (lift) in response to operation of the yaw pilot controls (pedals); and it moves an increasing component of aileron force (lift) and a decreasing component of thrust in response to operation of the roll pilot controls (wheel). However, during the transition from vertical to horizontal, the double universal joints 81, 83, 84, 85 of the yaw integrator mechanism reduces gradiently the amount of pivotal movement delivered to the yaw output arm 43 in response to a given pedal input at 36. As the plane approaches level flight, thrust differential becomes a lessening factor in yaw control and the conventional tail rudder 24 assumes its normal function.

When level flight is reached with the wings horizontal, as shown in FIG. 8, the aileron control arm 59 is conditioned in alignment with the vertical axis and is, therefore, operated solely by wheel input through the curved arm 48. Similarly, the thrust control arm 62 is conditioned for full pivotal movement in response to motion transmitted by the link 44 to the horizontal arm 52 of the integrator mechanism 50. However, the control yoke 86 has now pivoted with the wing to its locking position perpendicular to the shaft 37 and with the rotatable trunnion 84 thereof in the plane of rotation of the output arm 43 so that the system is locked. However, pedal operated shaft 37 is free to rotate about trunnion 83.

Preferred or simplified embodiments of the invention have been shown for purposes of illustration, and it is apparent that modification and changes therein can be made without departing from the spirit and scope of the invention which should be limited only by the claims appended hereto.

What is claimed as invention is:

1. An aircraft comprising
a fuselage,
a pair of wings mounted on said fuselage for pivotal movement about an axis longitudinal thereof between a level position with the airfoil surfaces thereof disposed generally parallel to the longitudinal axis of said fuselage and an upright position with the airfoil surfaces thereof disposed generally transverse of said fuselage axis,
means operative to tilt said wings to any selected angle between said level and upright positions,
a lift member on each of said pair of wings operative when actuated to direct a force against said each wing generally transverse to the airfoil surfaces thereof,
lift differential control means operative to actuate said lift members differentially,
thrust means on each of said pair of wings for delivery when actuated of a force against said wing generally parallel to said airfoil surfaces,
thrust control means operative to actuate said thrust means differentially,
separate yaw and roll pilot controls,
and integrating means operatively connected to both of said pilot controls and to both of said lift and thrust differential controls,
said integrating means being conditioned when said wings are in said level position to preclude transmission motion from said yaw pilot control to said thrust differential control means and to transmit motion from said roll pilot control to said lift differential control means, and
being conditioned when said wings are in said upright position to transmit motion from said yaw pilot control to said lift differential control means and to transmit motion from said roll pilot control to said thrust differential control means.

2. An aircraft comprising
a fuselage,
a pair of wings mounted on said fuselage for pivotal movement about an axis longitudinal thereof between a level position with the airfoil surfaces thereof disposed generally parallel to the longitudinal axis of said fuselage and an upright position with the airfoil surfaces thereof disposed generally transverse of said fuselage axis, means operative to tilt said wings to any selected angle between said level and upright positions, a lift member on each of said pair of wings operative when actuated to direct a force against said each wing generally transverse to the airfoil surfaces thereof, lift differential control means operative to actuate said lift members differentially, thrust means on each of said pair of wings for delivering when actuated a force against said wing generally parallel to said airfoil surfaces, thrust differential control means operative to actuate said thrust means differentially, separate yaw and roll pilot controls, an integrating mechanism including a first lever arm connected to said yaw pilot control so as to be pivoted thereby and a second lever arm connected to said roll pilot control so as to be pivoted thereby, each of said lift and thrust differential control means being operatively connected to both of said first and second lever arms, the operative connections of said control means being movable with pivotal movement of said wings so that as the wings pivot from said level position to said upright position the effective length of said first lever arm increases with respect to the lift differential control means and decreases with respect to the thrust differential control means and the effective length of said second lever arm decreases with respect to the lift differential control means and increases with respect to the thrust differential control means.

3. The aircraft defined in claim 2 including a rudder pivotable on said fuselage and increasingly effective to control yaw as the speed of forward flight increases, and wherein said yaw pilot control includes motion restraining means movable with said wings for gradiently reducing the pivotal movement of said first lever arm produced by said yaw pilot control as said wings pivot toward said level position.

4. An aircraft comprising
a fuselage,
a pair of wings mounted on said fuselage for pivotal movement about a tilt axis longitudinal thereof between a level position with the airfoil surfaces thereof disposed generally parallel to the longitudinal axis of said fuselage and an upright position with the airfoil surfaces thereof disposed generally transverse of said fuselage axis, means operative to tilt said wings to any selected angle between said level and upright positions, a lift member on each of said pair of wings operative when actuated to direct a force against said each wing generally transverse to the airfoil surfaces thereof, lift differential control means operative to actuate said lift members differentially, thrust means on each of said pair of wings for delivering when actuated a force against said wing generally parallel to said airfoil surfaces, thrust differential control means operative to actuate said thrust means differentially, separate yaw and roll pilot controls, an integrating mechanism comprising a generally L-shaped member having first and second lever arms, said yaw pilot control including a yaw motion delivery member pivotally connected to said first lever arm, said roll pilot control including a roll motion delivery member pivotally connected to said second lever arm, said L-shaped member being conditioned to be pivoted about the longitudinal axes of both of said first and second arms, each of said motion delivery members being constrained to move so as to cause the one of said first and second lever arms connected thereto to pivot about the axis of the other of said lever arms, said lift and thrust differential control means each including arms pivotally mounted on said L-shaped member about a shift axis perpendicular to said longitudinal axes, said thrust differential control arm being connected to and movable with said wings from along the axis of said first lever arm when said wings are in said level position to along the axis of said second lever arm to pivot therewith when said wings are in said upright position, said lift differential control arm being movable with said wings from along the axis of said second lever arm when said wings are in their level position to along the axis of said first lever arm to pivot therewith when said wings are in their upright position.

5. The aircraft defined in claim 4 wherein said shift axis is coincidental with said tilt axis.

6. The aircraft defined in claim 4 wherein said yaw pilot control includes a yaw input member adapted to be manipulated by the pilot, said yaw motion delivery member being conditioned to transmit motion from said yaw input member, and means for decreasing the ratio of movement between said yaw control means and said yaw motion delivery member as said wings are moved from their upright position toward their level position.

7. The aircraft defined in claim 4 wherein said yaw pilot control includes a yaw input member adapted to be manipulated by the pilot, an output yoke connected to said yaw motion delivery member, a trunnion rotatably mounted between the arms of said output yoke, a control yoke, a trunnion rotatably mounted between the arms of said control yoke, said output and control yoke trunnions being rigidly connected perpendicular to each other so that said output yoke trunnion is pivotable about the axis of said control yoke trunnion, means connected to said yaw input member for pivoting said output yoke about a yaw input axis intersecting the connection between said output yoke and control yoke trunnions, said control yoke being fixed to said wings to pivot therewith from the locked position when the wing is in said level position wherein said control yoke trunnion is perpendicular to said yaw input axis to a fully released position when the wings are in said upright position wherein said control yoke trunnion is coaxial with said yaw input axis.

8. The aircraft defined in claim 4 wherein said yaw pilot control includes a yaw input shaft adapted to be rotated in response to pilot manipulation, an input yoke extending concentrically from said input shaft, a frame rotatably mounted between the arms of said input yoke, a motion transmitting trunnion rotatably mounted across said frame in a plane of said yaw input shaft, an output trunnion and control trunnion in planes of said input shaft rigidly connected to said motion transmitting trunnion perpendicular thereto and to each other, a control yoke in which said control trunnion is journalled fixed to the wings to pivot therewith between a locked position when the wings are in said level position wherein said control trunnion is perpendicular to said input shaft and a fully released position when the wings are in said upright position wherein said control trunnion is coaxial with said input shaft and said frame and said output trunnion are free to pivot about said control trunnion through the full arc of movement delivered to said input shaft by said yaw control means, an output yoke in which said output trunnion is journaled, and means connecting said output yoke to said yaw motion delivery member.

9. The aircraft defined in claim 8 wherein said control yoke is secured to the wings by a releasable connection and biasing means normally maintaining said connection intact.

10. The aircraft defined in claim 8 wherein said control yoke is pivotally connected to said wings,
latching means engageable with said control yoke to hold it against movement,
means biasing said latching means into operative engagement with said control yoke, and
cam means on said control yoke operable under sufficient force to overcome said biasing means to release said latching means.

11. In an aircraft having a fuselage,
a pair of wings,
pivotal means mounting said pair of wings for movement between a horizontal position and a vertical position,
means for positioning said wings in any selected angle between said horizontal and vertical positions,
ailerons on each of said pair of wings,
forward thrust means on each of said pair of wings adapted to project a high velocity gas stream over said ailerons in all positions of said wings, and a rudder,
the combination in said aircraft of,
mechanism for controlling roll throughout all positions of said wings,
and mechanism for controlling yaw throughout all positions of said wings,
said last named mechanism comprising an integrating device operable when motion is transmitted thereto while the wings are in their vertical position to actuate said ailerons only and when the wings are shifted to their horizontal position to distribute motion transmitted thereto in gradiently increasing ratio between said thrust means and said ailerons,
a yaw input member movable by the pilot,
an output yoke connected to said integrating device to transmit motion thereto,
an output trunnion rotatably mounted between the arms of said output yoke,
a control yoke,
a control trunnion rotatably mounted between the arms of said control yoke, said control and output trunnions being rigidly connected perpendicular to each other so that said output trunnion is pivotable about the axis of said control trunnion, and
means connected to said yaw input member for pivoting said output yoke about a yaw input axis passing through the connection between said output yoke and said control yoke trunnions, said control yoke being fixed to said wings to pivot therewith from a locked position when the wings are in said horizontal position wherein said control trunnion is perpendicular to said yaw input axis to a fully released position when the wings are in said vertical position wherein said control trunnion is coaxial with said yaw input axis.

12. In an aircraft having a fuselage,
a pair of wings,
pivotal means mounting said pair of wings for movement between a horizontal position and a vertical position,
means for positioning said wings in any selected angle between said horizontal and vertical positions,
ailerons on each of said pair of wings,
forward thrust means on each of said pair of wings adapted to project a high velocity gas stream over said ailerons in all positions of said wings, and a rudder,
the combination on said aircraft of
mechanism for controlling roll throughout all positions of said wings and mechanism for controlling yaw throughout all positions of said wings,
said last named mechanism comprising an integrating device operable when motion is transmitted thereto while the wings are in their vertical position to actuate said ailerons only and when the wings are shifted to their horizontal position to distribute motion transmitted thereto in gradiently increasing ratio between said thrust means and said ailerons,
a yaw input shaft rotatable in response to pilot manipulation,
an input yoke extending concentrically from said input shaft,
a frame rotatably mounted between the arms of said input yoke,
a motion transmitting trunnion rotatably mounted across said frame in an axial plane of said yaw input shaft,
an output trunnion and a control trunnion in axial planes of said input shaft rigidly connected to said motion transmitting trunnion perpendicular thereto and to each other,
a control yoke in which said control trunnion is journaled fixed to the wings to pivot therewith between a locked position when the wings are in said horizontal position wherein said control trunnion is perpendicular to said input shaft and a fully released position when the wings are in said vertical position wherein said control trunnion is coaxial with said input shaft and said frame and said output trunnion are free to pivot about said control trunnion through the full arc of movement delivered to said input shaft,
an output yoke in which said output trunnion is journaled, and
means connecting said output yoke to said integrating device.

13. In an aircraft having a fuselage,
a pair of wings,
pivotal means mounting said pair of wings for movement between a horizontal position and a vertical position,
means holding said wings in any selected position,
ailerons on each of said pair of wings,
forward thrust means on each of said pair of wings adapted to project a high velocity gas stream over said ailerons in all positions of said wings, and a rudder,
the combination in said aircraft of yaw and roll controlling mechanism comprising,
separate yaw and roll pilot controls,
a first lever arm connected to said yaw pilot control so as to be pivoted thereby and a second lever arm connected to said roll pilot control so as to be pivoted thereby,
actuating mechanisms for said ailerons and said thrust means respectively,
each of said actuating mechanisms being operatively connected to said first and second lever arms,
the operative connections of said actuating mechanisms being movable with pivotal movement of said wings so that as the wings pivot from said horizontal position to said vertical position the effective length of said first lever arm increases with respect to the aileron actuating mechanism and decreases with respect to the thrust means actuating mechanism and the effective length of said second lever arm decreases with respect to the aileron actuating mechanism and increases with respect to the thrust means actuating mechanism.

14. In an aircraft having a fuselage,
a pair of wings,
pivotal means mounting said pair of wings for movement between a horizontal position and a vertical position, means holding said wings in any selected position, ailerons on each of said pair of wings, forward thrust means on each of said pair of wings forward of said ailerons and adapted to project a high velocity gas stream over said ailerons in all positions of said wings, and a rudder, the combination in said aircraft of yaw and roll controlling mechanism comprising, a yaw input device movable in response to pilot manipulation, a yaw motion delivery member connected to and movable by said input device, a roll input device movable in response to pilot manipulation, a roll motion delivery member connected to and movable by said roll input device, an integrating mechanism comprising a generally L-shaped member having first and second lever arms, said yaw motion delivery member being pivotally connected to said first lever arm, said roll motion delivery member being pivotally connected to said second lever arm, said L-shaped member being conditioned to be pivoted about the longitudinal axes of both of said first and second arms, each of said motion delivery members being constrained to move to cause the one of said first and second lever arms connected thereto to pivot about the axis of the other of said lever arms, aileron control arm and a thrust means control arm both pivotally mounted on said L-shaped member about a shift axis spanwise of said wings, said thrust means control arm being connected to and movable with said wings from a position along the axis of said first lever arm when said wings are horizontal to a position along the axis of said second lever arm when said wings are vertical, said aileron control arm being movable with said wings from a position along the axis of said second lever arm when said wings are horizontal to a position along the axis of said first lever arm when said wings are vertical, said aileron control arm and said thrust means control arm being operative when pivoted with said first or second lever arms to operate differentially said ailerons and thrust means respectively.

15. An aircraft comprising a fuselage, aircraft supporting wing structure having portions thereof extending transversely of said fuselage from each side thereof, said wing structure including airfoil surfaces thereon, means pivotally mounting said wing structure on said fuselage for pivotal movement between a generally horizontal position and a generally vertical position, said aircraft when said wing structure is in said horizontal position being adapted for operation as a normal fixed wing aircraft, said aircraft when said wing structure is in said vertical position being adapted for vertical take-off and landing, means in conjunction with said wing structure for pivotally moving said structure whereby said structure may be pivoted between said horizontal and vertical positions and vice versa while said aircraft is airborne, at least one propeller operatively mounted on and pivotal with said wing structure on each side of said fuselage, each said propeller projecting from the leading edge of said wing structure and being rotatable about an axis which extends generally parallel to the airfoil surfaces of said wing structure whereby the air stream produced by said propellers is directed over said airfoil surfaces in all positions of said wing structure, a pair of ailerons on said wing structure one on each side of said fuselage, and pilot operable means for actuating said ailerons in all positions of said wing structure, said ailerons being operative when actuated by said pilot operable means to translate the force of said air stream impinging thereupon into a force which extends generally transverse of said airfoil surfaces whereby said ailerons are effective in all positions of said wing structure for modifying flight characteristics of said aircraft, said ailerons when thus actuated when said wing structure is in said generally vertical position defining the sole effective means for controlling yaw of said aircraft, the sum of the diameters of the circles defined by the rotary paths of the tips of said propellers being generally equal to the sum of the effective lengths of the portions of said wing structure which lie on opposite sides of said fuselage so that said wing structure and the ailerons thereon are at all times during rotation of said propellers directly in and covered by said air stream whereby maximum effectiveness is imparted to said ailerons in all positions of said wing structure.

16. An aircraft comprising a fuselage, wing structure including airfoil surfaces thereon pivotally mounted on said fuselage, said wing structure being pivotally movable between a first position in which the airfoil surfaces thereof are disposed generally parallel to the longitudinal axis of said fuselage and a second position in which the airfoil surfaces thereof are disposed generally transverse to said fuselage axis, aircraft propelling thrust means on said wing structure, means in conjunction with said wing structure for pivotally moving said structure between said positions when said aircraft is airborne whereby said aircraft when said wing structure is in said second position and when said thrust means is actuated may take off and land vertically, at least one lift member on said wing structure which is effective when actuated to direct a force against said wing structure in a direction generally transverse to the airfoil surfaces thereof, pilot operable yaw and roll controls for selectively actuating and regulating said thrust means and said lift member whereby yaw and roll of said aircraft may be pilot controlled in all positions of said wing structure, and integrating means operatively connected between said pilot controls and said lift member and said thrust means for integrating and correlating operation of said lift member and said thrust means when said wing structure is in said first or second position or in any intermediate position therebetween, said integrating means being conditioned when said wing structure is in said first position to preclude regulation of said thrust means by said yaw pilot controls and to regulate said lift member through said roll pilot controls, said integrating means also being conditioned when said wing structure is in said second position to regulate said lift member through said yaw pilot controls and to regulate said thrust means through said roll pilot controls, whereby aircraft yaw and roll are controllable through the same pilot controls in all positions of said wing structure.

17. An aircraft comprising a fuselage, wing structure including airfoil surfaces thereon pivotally mounted on said fuselage, said wing structure being pivotally movable between a first position in which the airfoil surfaces thereof are disposed generally parallel to the longitudinal axis of said fuselage and a second position in which the airfoil surfaces thereof are disposed generally transverse to said fuselage axis, aircraft propelling thrust means on said wing structure for directing a high velocity air stream over said wing structure, means in conjunction with said wing structure for pivotally moving said structure between said positions when said aircraft is airborne whereby said aircraft when said wing structure is in said second position and when said thrust means is actuated may take off and land vertically, a pair of differentially adjustable ailerons on said wing structure one on each side of said fuselage which are effective when actuated to direct a force against said wing structure in a direction generally transverse to the airfoil surfaces thereof in response to said air stream impinging thereupon, separate pilot operable yaw and roll controls for selectively actuating and regulating said thrust means and said ailerons whereby yaw and roll of said aircraft may be pilot controlled in all positions of said wing structure, and integrating means operatively connected between said pilot controls and said ailerons and said thrust means for integrating and correlating operation of said ailerons and said thrust means when said wing structure is in said first or second position or in any intermediate position therebetween, said integrating means being conditioned when said wing structure is in said first position to preclude regulation of said thrust means by said yaw pilot controls and to regulate said ailerons through said roll pilot controls, said integrating means being conditioned when said wing structure is in said second position to regulate said ailerons through said yaw pilot controls and to regulate said thrust means through said roll pilot controls, and said integrating means also being conditioned when said wing structure is in an intermediate position to correlate and distribute regulation of said thrust means and ailerons gradiently between said yaw and roll pilot controls, whereby aircraft yaw and roll are controllable through the same pilot controls in all positions of said wing structure.

18. In an aircraft having a fuselage and wing structure including airfoil surfaces thereon extending transversely of said fuselage, means pivotally mounting said wing structure for movement between a generally horizontal position and a generally vertical position, ailerons on said wing structure, thrust means on said wing structure positioned to direct an air stream produced thereby over said airfoil surfaces and said ailerons in all positions of said structure, and pilot operable means for controlling yaw and roll of said aircraft in all positions of said wing structure; said pilot operable means comprising first and second pilot controls and movable first and second integrating mechanisms; said first integrating mechanism being operable when motion is imparted thereto by said first pilot control when said wing structure is in said vertical position to regulate said ailerons independently of said thrust means and as said wing structure is shifted toward said horizontal position to distribute motion imparted thereto by said first pilot control in gradiently increasing ratio between said thrust means and said ailerons, said first mechanism also being operable when motion is imparted thereto by said second pilot control when said wing structure is in said vertical position to regulate said thrust means independently of said ailerons and as said wing structure is shifted toward said horizontal position to distribute motion imparted thereto in gradiently increasing ratio between said ailerons and said thrust means until all motion imparted thereto by said second pilot control is operable to regulate said ailerons independently of said thrust means when said wing structure is in said horizontal position; said second integrating mechanism being operatively interposed between said first pilot control and said first integrating mechanism and being operable for gradiently modifying the effect of said first pilot control on said first mechanism as said wing structure pivots between said vertical position and said horizontal position.

19. In an aircraft having a fuselage and wing structure including airfoil surfaces thereon extending transversely of said fuselage, means pivotally mounting said wing structure for movement between a generally horizontal position and a generally vertical position, a pair of differentially movable ailerons on said wing structure one on each side of said fuselage, differentially operable thrust means on said wing structure positioned to direct an air stream produced thereby over said airfoil surfaces and said ailerons in all positions of said structure, and pilot operable means operatively connected with said ailerons and said thrust means for controlling yaw and roll of said aircraft in all positions of said wing structure; said pilot operable means comprising separately operative first and second pilot controls and movable first and second integrating mechanisms; said first integrating mechanism being operatively connected with both said first and second pilot controls and being operable when motion is imparted thereto by said first pilot control when said wing structure is in said vertical position to regulate said ailerons independently of said thrust means and as said wing structure is shifted toward said horizontal position to distribute motion imparted thereto by said first pilot control in gradiently increasing ratio between said thrust means and said ailerons, said first mechanism also being operable when motion is imparted thereto by said second pilot control when said wing structure is in said vertical position to regulate said thrust means independently of said ailerons and as said wing structure is shifted toward said horizontal position to distribute motion imparted thereto in gradiently increasing ratio between said ailerons and said thrust means until all motion imparted hereto by said second pilot control is operable to regulate said ailerons independently of said thrust means when said wing structure is in said horizontal position; said second integrating mechanism being interposed between and operatively connecting said first pilot control and said first integrating mechanism and being operable for gradiently modifying the effect of said first pilot control on said first mechanism as said wing structure pivots between said vertical position and said horizontal position.

20. The aircraft of claim 18 including pilot controllable primary means adjacent the rear of said fuselage for controlling pitch of said aircraft during normal forward flight thereof, and pilot controllable auxiliary means adjacent the rear of said fuselage for controlling pitch of said aircraft during vertical take-off or landing of said aircraft and during slow forward flight thereof.

21. A tilt wing aircraft comprising a fuselage, wing structure pivotally mounted on said fuselage and selectively movable between a horizontal position and a vertical position, said aircraft when said wing structure is in said vertical position being adapted for vertical take-off and landing, thrust means on said wing structure for propelling said aircraft in all positions of said wing structure, means for selectively pivoting said wing structure between said positions while said aircraft is in flight, at least one lift member on said wing structure for directing a force against said wing structure generally transversely thereof when actuated, separate pilot operable yaw and roll controls operatively connected with said thrust means and said lift member for selectively actuating and regulating said thrust means and said lift member during flight, and integrating mechanism interposed between said pilot controls and said thrust means and said lift member for integrating and correlating operation of said thrust means and said lift member, said mechanism being conditioned when said wing structure is in any intermediate position of transition between said horizontal and said vertical positions to gradiently modify the effect of movement of each of said yaw and roll pilot controls on said thrust means and on said lift member as said wing structure is pivoted between said horizontal and said vertical positions.

22. The aircraft of claim 21 which includes a rudder movably mounted on said fuselage aft of said wing structure, said rudder being operatively connected with said yaw pilot control for actuation thereby in all positions of said wing structure, and second integrating mechanism interposed between said yaw pilot control and said first mentioned integrating mechanism, said second mechanism being conditioned when said wing structure is in said horizontal position to eliminate the effect of movement of said yaw pilot control on said first integrating mechanism whereby said rudder only is actuated by said yaw pilot control for regulating yaw of said aircraft when said wing is in said horizontal position, said second mechanism also being conditioned to gradiently increase the effect of said yaw pilot control on said first integrating mechanism as said wing structure is pivoted toward said vertical position.

23. Apparatus for effecting an interchange of control functions in the control system of a vertical take-off and landing aircraft of the type having wings adapted to be rotated from a horizontal position in horizontal flight to a vertical position in vertical flight, each wing being provided with a roll control device and at least one thrust producing device: said apparatus comprising a first bellcrank fixed to the fuselage of the aircraft in such a manner to prevent rotation of the bellcrank in a plane containing the arms thereof, and a second bellcrank fixed to a wing of the aircraft in such a manner to prevent rotation of the bellcrank relative to the wing in the plane containing the arms thereof, said second bellcrank being positioned in relation to said first bellcrank so that the arms of the second bellcrank are in a plane parallel to the plane containing the arms of the first bellcrank, the said first and second bellcranks being mounted on the axis of rotation of said wing so that rotation of said wing from the horizontal to the vertical position causes a corresponding relative movement of the first and second bellcranks with respect to each other; a first control rod connected to one leg of said first bellcrank and a second control rod connected to the other leg of said first bellcrank, a third control rod connected to one leg of said second bellcrank and adapted to control the thrust of said thrust producing device mounted on said wing a fourth control rod connected to the other leg of said second bellcrank and adapted to control the operation of the roll control device on said wing; in one position of said wing motion of said first control rod generally longitudinally of the axis of rotation of the wing being operative to control the thrust of said thrust producing device and corresponding motion of the second control rod being operative to control the operation of the roll control device, and motion of the first control rod generally longitudinally of the axis of rotation of the wing being operative to control the operation of the roll control device and corresponding motion of the second control rod being operative to control the thrust of the thrust producing device in the other position of said wing.

24. Apparatus for effecting an interchange of control functions in the control system of a vertical takeoff and landing aircraft of the type having wings adapted to be rotated from a horizontal position in horizontal flight to a vertical position in vertical flight, each wing being provided with an aileron and at least one engine having a variable pitch propeller: said apparatus comprising a first bellcrank fixed to the fuselage of the aircraft in such a manner to prevent rotation of the bellcrank in a plane containing the arms thereof, and a second bellcrank fixed to the wing of the aircraft in such a manner to prevent rotation of the bellcrank relative to the wing in the plane containing the arms thereof, said second bellcrank being positioned in relation to said first bellcrank so that the arms of the second bellcrank are in a plane parallel to the plane containing the arms of the first bellcrank, the said first and second bellcranks being mounted on the axis of rotation of said wing so that rotation of said wing from the horizontal to the vertical position causes a corresponding relative movement of the first and second bellcranks with respect to each other; a first control rod connected to one leg of said first bellcrank and a second control rod connected to the other leg of said first bellcrank, a third control rod connected to one leg of said second bellcrank and adapted to control the pitch of propellers mounted on said wing and a fourth control rod connected to the other leg of said second bellcrank and adapted to control the position of the aileron on said wing; in one position of said wing motion of said first control rod generally longitudinally of the axis of rotation of the wing being operative to control the pitch of said propellers and corresponding motion of the second control rod being operative to control the position of the aileron, and motion of the first control rod generally longitudinally of the axis of rotation of the wing being operative to control motion of the aileron and corresponding motion of the second control rod being operative to control the pitch of the propellers in the other position of said wing.

References Cited by the Examiner
UNITED STATES PATENTS

| | | | |
|---|---|---|---|
| 2,382,824 | 8/45 | Solomon | 244—7 |
| 2,448,392 | 8/48 | Quady | 244—7 |
| 2,478,847 | 9/49 | Stuart | 244—7 |
| 2,936,967 | 5/60 | Dancik | 244—7 |
| 2,936,968 | 5/60 | Mazzitelli | 244—7 |

FERGUS S. MIDDLETON, *Primary Examiner.*

MILTON BUCHLER, *Examiner.*